United States Patent [19]

Morawski et al.

[11] 4,383,368
[45] May 17, 1983

[54] CONCENTRICITY GAGE

[76] Inventors: Longine V. Morawski, 1497 Boston Blvd., Detroit, Mich. 48206; Lawrence V. Morawski, 38255 Fairway Ct., Mt. Clemens, Mich. 48044

[21] Appl. No.: 303,918

[22] Filed: Sep. 21, 1981

[51] Int. Cl.³ .............................................. G01B 5/25
[52] U.S. Cl. ................................ 33/174 Q; 33/147 K; 33/178 R; 33/180 R; 33/199 R
[58] Field of Search ............ 33/174 Q, 178 R, 147 K, 33/178 B, 180 R, 181 R, 199 R

[56] References Cited

U.S. PATENT DOCUMENTS

| 2,700,224 | 1/1955 | Johnson | 33/199 R |
| 2,782,521 | 2/1957 | Parker et al. | 33/174 Q |
| 3,316,649 | 5/1967 | O'Connor | 33/178 R |
| 3,534,480 | 10/1970 | Jordan et al. | 33/174 Q |
| 4,106,206 | 8/1978 | Piehl | 33/174 Q |

Primary Examiner—Willis Little
Attorney, Agent, or Firm—Barnes, Kisselle, Raisch, Choate, Whittemore & Hulbert

[57] ABSTRACT

A bore concentricity gage having a collet at one end adapted to be expanded into close fitting engagement with one of two axially spaced bores on a workpiece and a hollow concentricity plug at its opposite end adapted to be received in close fitting engagement with the other bore. The plug has an accurately concentric bore therein adapted to be engaged by a rotatable "go" bushing journalled on a mandrel having an expander for the collet thereon.

14 Claims, 2 Drawing Figures

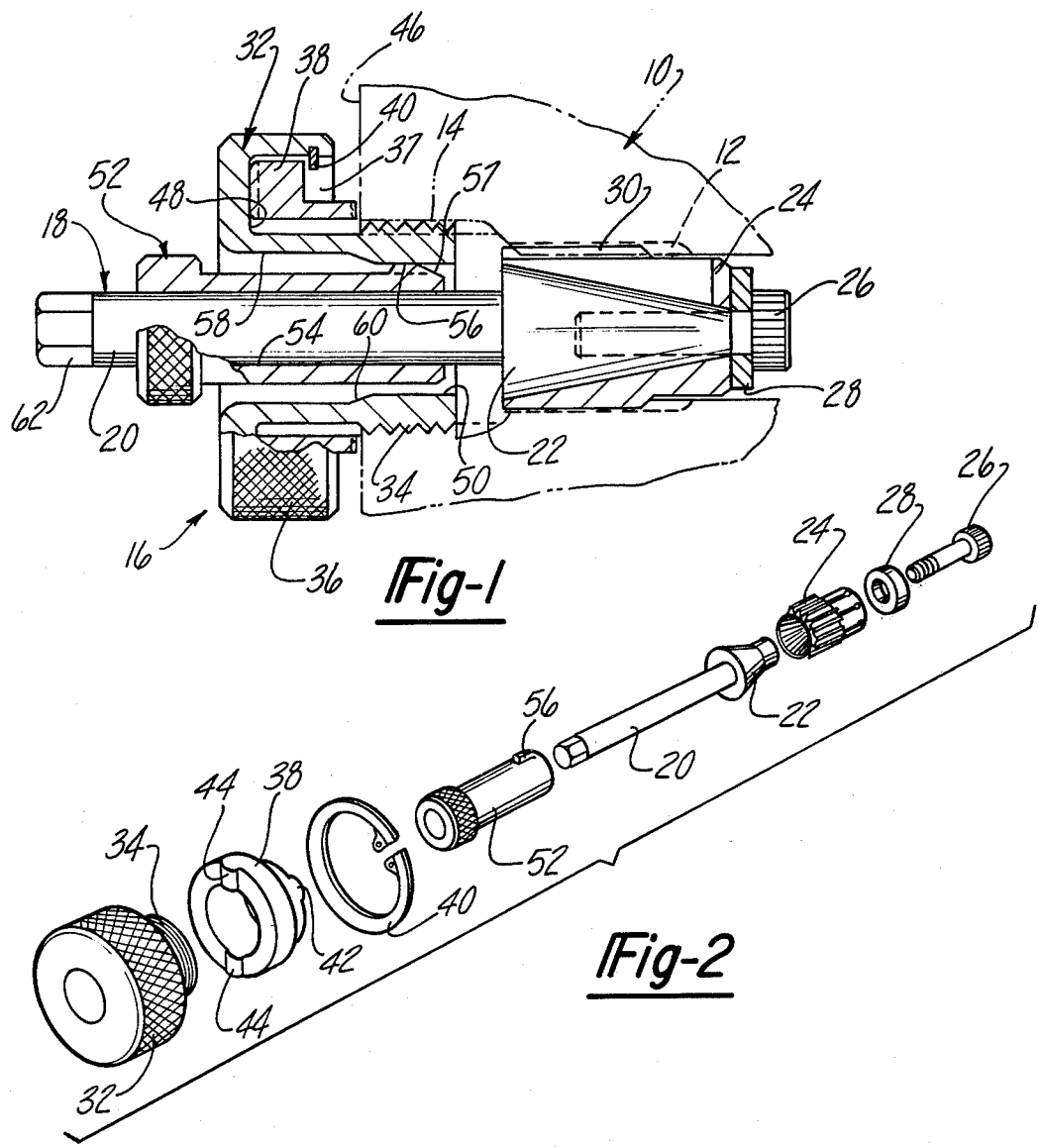

CONCENTRICITY GAGE

This invention relates to a concentricity gage and, more particularly, to a gage for determining the concentricity between two axially spaced bores in a workpiece.

Many types of workpieces are formed with two axially spaced bores which must be concentric with one another to a high degree of accuracy. One or both of these bores may be a cylindrical surface, an axially splined surface or a thread. Gages for determining whether such bores, especially those having a pitch diameter, are concentric within the desired degree of accuracy are normally of complicated and costly construction. Furthermore, conventional gages of this type are so designed as to require an entirely separate gage for each differently sized bore.

The primary object of this invention is to provide a concentricity gage that is of simple and relatively economical construction and which requires the substitution of only two components for gaging differently sized bores.

Other objects features and advantages of the present invention will become apparent from the following description and accompanying drawing, in which:

FIG. 1 is a generally vertical sectional view of a concentricity gage according to the present invention; and FIG. 2 is an exploded perspective view of the gage.

The particular gage shown in the drawing is designed for checking the concentricity of bores in a workpiece 10, such as a splined bore 12 and a threaded bore 14 spaced axially from bore 12. However, it will be apparent from the description that follows that the gage of this invention can be designed for checking the concentricity of two axially spaced bores of various types regardless of whether they are plain cylindrical bores, splined bores or threaded bores.

The gage itself which is designated 16, comprises a mandrel 18 having an accurately ground, cylindrical shaft 20 extending axially from and concentric with a conical collet expander 22. A generally conventional expandable collet 24 is arranged on collet 22 and is adapted to be expanded by means of a screw 26 threaded into the smaller end of expander 22 and having a washer 28 thereon adapted to abut against the end of collet 24. The external surface of collet 24 is formed for close fitting relation with the bore 12 of the workpiece. In the particular embodiment illustrated in collet 24 is formed with a plurality of axially extending splines 30 for close interfitting engagement with the splines in bore 12. The tight fitting relationship between collet 24 and bore 12 is obtained by tightening screw 26 so as to expand collet 24 firmly into bore 12. Expander 22 and collet 24 are ground so as to be concentric to a high degree of accuracy to the central longitudinal axis of mandrel 18. Thus, when collet 24 is expanded into engagement with bore 12, the longitudinal axis of mandrel 18 is concentric to a high degree of accuracy with the pitch circle of bore 12.

Gage 10 includes a plug 32 which is shaped and sized to be snugly received within the bore 14 of the workpiece. Thus, if the bore 14 is threaded as shown, plug 32 would be formed with a thread 34 having a close fit with the threaded bore 14 in the workpiece. Plug 32 has an enlarged knob 36 machined with an annular recess 37 to receive a rocker ring 38. Ring 38 is loosely retained within knob 36 by a snap ring 40. One end face of ring 38 is fashioned with a pair of diametrically opposite, rounded protuberances 42. The opposite end face, that is, the end face within knob 36, is likewise formed with a pair of diametrically opposed, axially projecting, rounded protuberances 44. Protuberances 44 are displaced circumferentially 90° from the protuberances 42. When plug 32 is threaded fully into bore 14 protuberances 42 engage end face 46 of workpiece 10 and protuberances 44 abut against the internal face 48 of plug 32. These two sets of protuberances prevent the plug 32 from becoming cocked or skewed to the axis of bore 14 in the event that the face 46 on the workpiece is not accurately perpendicular to the axis of bore 14. Plug 32 is also formed with an accurately dimensioned bore 50 which is accurately concentric to the pitch diameter of thread 34. Bore 50 extends at least to the end portion of plug 32 on which the thread 34 is ground.

When the plug 32 and the collet 24 are interengaged with their respective bores 12 and 24 on the workpiece, the cylindrical shank 20 of mandrel 18 extends axially through bore 50 and beyond the outer end face of plug 32. A "go" bushing 52 has a central axial bore 54 which has an accurate sliding fit on the shank 20 of mandrel 18. At one end thereof bushing 52 is formed with a radial enlargement 56. The radially outermost surface of enlargement 56 is spaced radially from the central axis of bore 54 a distance relative to bore 50 which represents the maximum concentricity tolerance adapted to be checked by the gage. For example, if the gage is designed to check the concentricity of bores 12 and 14 within 0.005", then the radius to the outer surface of enlargement 56 is ground substantially 0.005" less than the radius of bore 50. To facilitate the introduction of the leading end of bushing 52 into bore 50, bushing 52 is formed with a radially inwardly tapered leading end 57 and plug 32 is formed with an enlarged bore 58 adjacent its outer end which is connected with bore 50 by a conical portion 60.

In using the gage of this invention collet 24 is inserted in the splined bore 12 of the workpiece. Thereafter mandrel 18 is directed through the threaded bore 14 in the workpiece so as to seat collet expander 22 within collet 24. Screw 26 is then tightened so that collet 24 is expanded into firm engagement with bore 12 in the workpiece. The mandrel is prevented from rotatin when screw 26 is tightened by gripping the non-circular end 62 with a wrench. After the mandrel is so engaged with the workpiece, concentricity plug 32 is threaded into bore 14 to a position wherein rocker ring 38 is coamped firmly between the end face 46 of the workpiece and the face 48 of recess 37. Bushing 52 is then rotated and advanced on the shank 20 of mandrel 18 so that the enlargement 56 is disposed within bore 50. If bore 14 is concentric to bore 12 within the specified tolerance, for example 0.005", then bushing 52 will rotate freely on shaft 20. However, if bores 14 and 12 are skewed relative to one another or offset radially relative to one another a distance greater than the specified tolerance, then the enlargement 56 will not rotate freely around 360° within bore 50. If bushing 52 binds within bore 50 this is an indication that the two bores 12 and 14 are not concentric within the required tolerance.

If it is desired to check the concentricity of two bore of different sizes than bores 12 and 14 within the same tolerance limits, it is only necessary to substitute a properly dimensioned collet 24 and a properly dimensioned plug 32. The same mandrel 18 may be used and the same "go" bushing 52 may be employed with the mandrel 18.

It is only necessary that collet 24 and plug 32 be dimensioned and have a configuration corresponding to the two bores in the workpiece to be checked. Thus, either of the bores can be threaded, splined or simply plain cylindrical surfaces. In any event, a collet such as shown at 24 should be employed so that the mandrel can be clamped to the workpiece so that its axis is accurately concentric with one of the bores in the workpiece. While the gage of this invention can be used for checking the concentricity of two cylindrical bores, its primary usefulness resides in checking the concentricity of two bores at least one of which has a pitch diameter as is the case with threaded and splined bores.

I claim:

1. A gage for checking the concentricity between two axially spaced bores in a workpiece comprising an expandable collet dimensioned to be received in one of said bores, a mandrel having a cylindrical shaft and an expander at one end thereof, said expander being accurately concentric to the longitudinal axis of the shaft and adapted to engage the collet to expand the same into firm and close fitting engagement with said one bore so that the axis of the shaft is accurately concentric with the axis of said one bore, a plug having an outer peripheral surface dimensioned to have a close fit in the other bore, said plug having a central axial bore therein accurately concentric with said outer peripheral surface and a gage bushing having a close sliding fit on said shaft, said gage bushing having an outer peripheral portion which, when the bushing is rotated on the shaft, defines a circle of revolution having a diameter less than the diameter of the bore in the plug by an amount corresponding to substantially twice the concentricity tolerance to be checked by the gage.

2. A gage as called for in claim 1 wherein the collet has a conical bore and the expander is conically shaped to expand the collet when advanced axially therein.

3. A gage as called for in claim 2 including a threaded member on said expander adapted to engage the collet for advancing the expander into the collet.

4. A gage as called for in claim 1 wherein the gage is adapted for use with workpiece in which one of the bores has a pitch diameter as distinguished from a smooth cylindrical bore, the component of the gage to be fitted into the last-mentioned bore, that is, either the collet or the plug, having an outer peripheral surface provided with the same pitch diameter.

5. A gage as called for in claim 1 wherein the plug or collet has an axially splined outer peripheral surface dimensioned to have a close fit with one of said bores in the workpiece of the same configuration.

6. A gage as called for in claim 1 wherein the plug or collet has a threaded outer surface dimensioned for threaded engagement with one of the bores in the workpiece which is similarly threaded.

7. A gage as called for in claim 1 wherein the collet has an axially splined outer surface dimensioned to have a close fit with a similarly splined bore in the workpiece.

8. A gage as called for in claim 1 wherein the plug has a threaded outer surface dimensioned to have a close fit with a similarly threaded bore in the workpiece.

9. A gage as called for in claim 1 wherein said other bore in the workpiece is a threaded bore, said plug being threaded at one end thereof for threaded engagement with the threaded bore, said plug having a rocker ring loosely mounted thereon, said rocker ring having axially opposed end faces, one of said end faces having a pair of diametrically opposed protuberances thereon adapted to engage the adjacent end face of the workpiece surrounding said threaded bore, the opposite end face of the rocker ring also having a pair of diametrically opposed protuberances thereon adapted to engage an annular face on the plug, the two sets of protuberances being circumferentially staggered 90° relative to one another whereby, when the threaded plug is advanced into the threaded bore in the workpiece to clamp the rocker ring between the plug and the workpiece, the rocker ring minimizes the tendency for the plug to distort in the event that said end face of the workpiece surrounding the threaded bore therein is not accurately perpendicular to the axis of the threaded bore.

10. A gage as called for in claim 1 wherein said outer peripheral portion of said gage bushing comprises a radial enlargement around a small circumferential portion of the bushing.

11. A gage as called for in claim 10 wherein said plug has a second bore spaced axially from said first-mentioned bore in the plug, the second bore in the plug being larger than the first bore in the plug and being connected therewith by a shoulder which tapers radially inwardly in a direction toward the smaller bore.

12. A gage as called for in claim 11 wherein the leading end of the gage bushing is tapered radially inwardly around its periphery.

13. A gage as called for in claim 1 wherein the second bore in the workpiece is a threaded bore, said plug having one end thereof threaded for interengagement with the threaded bore in the workpiece, the opposite end of the plug being of substantially larger diameter and having an annular recess therein opening axially in the direction of the threaded end of the plug, a rocker ring loosely disposed in said recess, said rocker ring having axially opposed end faces, one of the end faces of the rocker ring having a pair of diametrically opposed protuberances thereon, the opposite end face of the rocker ring also having a pair of diametrically opposed protuberances thereon, the two sets of protuberances being circumferentially staggered 90°, said rocker ring extending axially outwardly beyond the enlarged portion of the plug so that when the plug is threaded into the threaded bore in the workpiece, one end of the rocker ring is adapted to engage the adjacent end face of the workpiece surrounding the bore and the opposite end of the rocker ring is adapted to engage an annular surface within said recess.

14. A gage as called for in claim 1 wherein said plug has one end portion adapted to have a close fit with the second bore in the workpiece and having an opposite end portion adapted to project outwardly beyond the end face of the workpiece which surrounds said second bore, said bore in said plug being located axially within the portion of the plug adapted to have a close fit with the second bore in the workpiece.

* * * * *